United States Patent
Kuokkanen et al.

(10) Patent No.: US 6,784,841 B2
(45) Date of Patent: Aug. 31, 2004

(54) METHOD AND ARRANGEMENT FOR PERFORMING POSITIONING

(75) Inventors: Lauri Kuokkanen, Kempele (FI); Veli-Matti Takkula, Kiviniemi (FI); Tapani Vistbacka, Kempele (FI)

(73) Assignee: Scando Oy, Oulu (FI)

( * ) Notice: Subject to any disclaimer, the term of this patent is extended or adjusted under 35 U.S.C. 154(b) by 0 days.

(21) Appl. No.: 10/457,487

(22) Filed: Jun. 10, 2003

(65) Prior Publication Data

US 2004/0085243 A1 May 6, 2004

(30) Foreign Application Priority Data

Jun. 10, 2002 (FI) .............................................. 20021112

(51) Int. Cl.$^7$ ................................................ G01S 3/02
(52) U.S. Cl. .................... 342/450; 342/357.06; 342/457
(58) Field of Search ....................... 342/357.01, 357.06, 342/357.08, 450, 457

(56) References Cited

U.S. PATENT DOCUMENTS

| | | | |
|---|---|---|---|
| 2,062,003 A | 11/1936 | Hammond, Jr. | |
| 5,225,809 A | 7/1993 | Bunn | |
| 5,365,516 A * | 11/1994 | Jandrell | 370/335 |
| 5,774,829 A * | 6/1998 | Cisneros et al. | 701/213 |
| 5,977,913 A | 11/1999 | Christ | |
| 6,055,477 A | 4/2000 | McBurney et al. | |
| 6,204,813 B1 * | 3/2001 | Wadell et al. | 342/463 |

* cited by examiner

*Primary Examiner*—Dao Phan
(74) *Attorney, Agent, or Firm*—Young & Thompson

(57) ABSTRACT

The invention relates to a method and arrangement for positioning one or more mobile stations, in which the location of the mobile stations is determined in the horizontal direction using at least two radio direction finding stations. Information on the location of each mobile station is maintained on a server. The mobile station measures at least one variable proportional to the location of the mobile station in the vertical direction and signals information on the measurement results to a control unit time-divisionally at the same frequency controlled by the control unit. In the control unit the location of each mobile station is determined in the vertical direction on the basis of the signalled data and the data on the location is conveyed to the server, where the three-dimensional location of the mobile stations is determined. The locations of at least some of the mobile stations are displayed graphically.

26 Claims, 1 Drawing Sheet

METHOD AND ARRANGEMENT FOR PERFORMING POSITIONING

FIELD OF THE INVENTION

The invention relates to an arrangement and a method for performing positioning. In particular, the invention relates to determining the location of desired devices three-dimensionally.

BACKGROUND

How to determine the location of various mobile objects is a field under research. Various positioning methods have been developed for different mobile objects. One known solution is satellite positioning. It is based on the idea that orbital satellites transmit detectable and distinguishable signals at known frequencies. When a particular satellite receiver receives a signal from a plurality of satellites, it is able to determine its own location by means of signal transit time delays. One of these satellite positioning methods is known as Global Positioning System (GPS).

Various radio systems utilize system-specific characteristics in positioning. One positioning method known in cellular radio systems is based on the times of arrival (TOA, Time of Arrival; TDOA, Time Difference of Arrival) of the signals. In general, this method employs an extra receiver placed in connection with the radio system base stations, which receiver listens to mobile station transmission intended for another base station that serves the mobile station. The capacity of the method is limited, because each extra receiver can reliably measure only one mobile station at a time. Another method known in the cellular radio systems is based on the observed time difference (OTD) between the signals. In this method a mobile station measures the time difference between the base stations. The method requires information on the real time difference (RTD) of the base stations, if the base stations are not in synchronization. Positioning is performed on the basis of these data. These methods are only applicable in connection with the cellular radio systems.

One known method for radio transmitter positioning is a so-called direction finding (DF) method. In this method a signal transmitted by a mobile station is received by at least two DF receivers. Each DF receiver estimates the direction from which the mobile station signal is arriving. On the basis of this information it is possible to create a sector from each DF receiver, in the direction of which the mobile station is located. It can be determined that the mobile station is located at the intersection area of two or more sectors.

Drawbacks with the prior art solutions include inaccuracy and limited applicability. For instance, the methods based on the cellular radio systems are only applicable in the coverage areas of the systems, and they are not suitable for monitoring a large number of mobile stations, because the positioning would load the network excessively. Furthermore, most known methods perform positioning only two-dimensionally, and therefore they are not suitable for use inside buildings, for instance.

BRIEF DESCRIPTION OF THE INVENTION

The object of the invention is to provide a method and an arrangement implementing the method, which allows accurate and three-dimensional positioning of desired mobile stations. This is achieved by a method for positioning one or more mobile stations, in which the location of the mobile stations is determined in the horizontal direction using at least two direction finding stations. The method of the invention comprises maintaining on a server information on the location of each mobile station; measuring in a mobile station at least one variable proportional to the location of the mobile station in the vertical direction; signalling information from the mobile station to a control unit on the measurement results time-divisionally at the same frequency controlled by the control unit; determining in the control unit the location of each mobile station in the vertical direction on the basis of the signalled data; and transmitting the data on the location to the server; determining the three-dimensional location of the mobile stations in the server; displaying the location of at least some of the mobile stations graphically.

The invention also relates to an arrangement for performing the positioning, comprising a set of mobile stations to be located and at least two direction finding stations for determining the location of the mobile stations.

In the arrangement of the invention, the mobile stations are arranged to measure at least one variable proportional to altitude; and the arrangement comprises a server, which maintains information on the location of each mobile station; a control unit, which controls over a radio path the mobile station transmissions such that the mobile stations signal data to the control unit on the variable proportional to the altitude time-divisionally at the same frequency, and which control unit is arranged to determine at which altitude the mobile station is located on the basis of the data signalled by the mobile station; and to signal the altitude information to the server and that the server is arranged to determine the three-dimensional location of the mobile stations on the basis of the radio direction finding measurement and the altitude information, and that the arrangement comprises workstations arranged to display the location of at least some of the mobile stations graphically.

Embodiments of the invention are described in the dependent claims.

In the solution of a preferred embodiment of the invention three-dimensional positioning of transceivers is based on the use of radio direction bearings and data transmitted by transceivers and measured by sensors. A plurality of transceivers can be located using only one frequency by means of time division technique. High accuracy and good radio signal propagation also inside buildings are achieved by using frequencies within VHF or UHF range.

Several advantages are achieved with the method and arrangement of the invention. The solution allows three-dimensional positioning of a large number of transmitters and monitoring of their locations using just one radio frequency. Thus, the solution is extremely spectrum-efficient. Further, the transmitter structure is simple, because they need not support a large number of frequencies.

Time division refers here to the fact that transmitters transmit at the same frequency but at different times. Time division can be implemented as a polling arrangement, for instance, in which a control unit controls each portable transceiver to transmit at a given time.

In some preferred embodiments DF stations carrying out two-dimensional positioning are movable, such as vehicle-mounted stations. This enables flexible use of the arrangement in various applications. For instance, in case of a fire, mobile DF stations can be placed in different quarters of the fire area and the firemen can be equipped with portable transceivers. The DF stations measure the location of the transceivers in the horizontal direction. The transceivers measure e.g. atmospheric pressure and signal the measurement results to the control center of the arrangement. The control center also measures the atmospheric pressure, and the transceiver measurement results are scaled such that the location of each transceiver is found out in the vertical direction. The solution thus allows monitoring the location and movements inside the building of each fireman equipped with the transmitter. The location can be displayed graphically on a workstation screen. If so desired, it is very easy to illustrate the location by displaying the graphic on a suitable map base. The altitude at which the transceivers are located can be illustrated by different colours, for instance.

In some embodiments the transmitters comprise various sensors, which may measure ambient conditions. For instance, measurements of gas concentration and temperature may give valuable information, by which the safety of the firemen can be ensured.

In some embodiments the transceivers can be divided into different groups and observation can be performed group-wise.

Advantageously the arrangement comprises a control unit, which communicates with portable transceivers time-divisionally and a server, which controls the operation of the whole arrangement.

LIST OF DRAWINGS

In the following, the invention will be described in greater detail in connection with preferred embodiments, with reference to the attached drawings, in which FIG. 1 illustrates one example of an arrangement;

DESCRIPTION OF THE EMBODIMENTS

Figure 1:
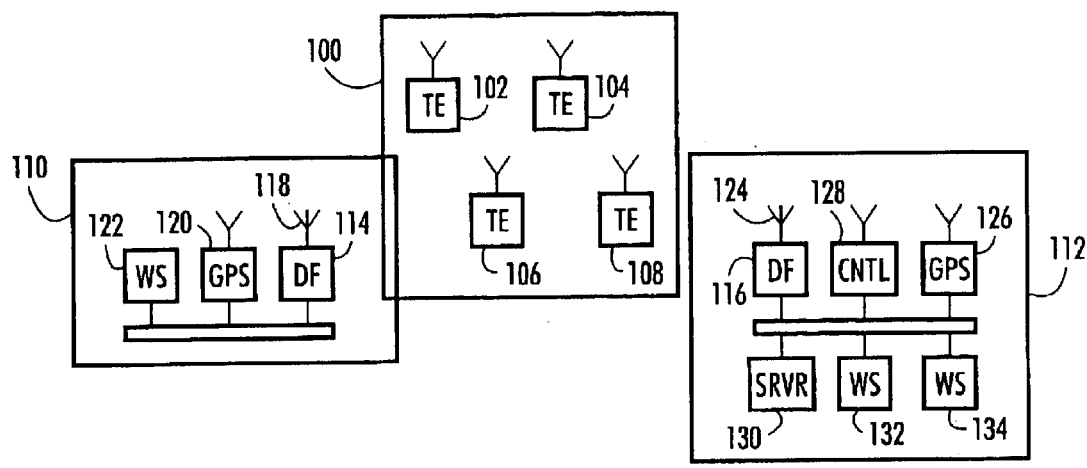

With reference to FIG. 1, let us study one example of the arrangement. There is a pre-defined area 100, within which positioning is to be performed. For instance, it can be an area, which comprises one or more buildings, any one of which is on fire or there is another similar emergency. The only essential thing is that there are persons or objects moving about the area, whose location is to be monitored. Each person is equipped with a portable transceiver 102 to 108. In different parts of the area there are placed mobile units 110, 112 which include DF stations, i.e. radio direction finding stations 114, 116. In the figure there are only four portable transceivers, but in practice their number may amount to several tens or even hundreds.

A first mobile unit 110 comprises an antenna 118 and at least one direction finding station 114, which is able to detect the direction, from which the signal of a portable transceiver was transmitted. The unit also comprises a satellite positioning unit 120, for instance a GPS receiver, by means of which the location of the unit can be determined. The unit may also comprise a workstation 122, with which the operation of the unit can be monitored and controlled. The devices of the unit can be interconnected by a local area network, for instance.

A second mobile unit 112 also comprises an antenna 124 and a direction finding station 116, which is able to detect the direction, from which the signal of a portable transceiver was transmitted. The unit also comprises a satellite positioning unit 126, for instance a GPS receiver. The unit also comprises a control unit or a control transceiver 128, which communicates with the portable transceivers, and a server 130, which controls the operation of the whole arrangement, and a set of workstations 132 to 134, by means of which it is possible to monitor graphically the three-dimensional location of the transceivers. The unit further comprises a reference sensor for calibrating altitude measurements. Typically, but not necessarily, the sensor is located in connection with the control transceiver. The devices of the unit can be interconnected by a local area network, for instance. The first and the second units communicate by means of a wireless local area network or a modem.

Let us study one embodiment by means of an imaginary example. Let us assume that there is a need to send a group of people, for instance rescue workers, firemen or the like, to a certain area. Typically, the size of the area may vary from an area of 200 m×200 m up to an area of 5 km×5 km, but the solution permits application to larger or smaller areas, as well. At the beginning, the mobile units 110 and 112 are placed on different sides of the area, advantageously in open areas, so that horizontal direction finding measurements are possible. The GPS receivers 120, 126 of the unit determine the location of the units. The second unit measures its own vertical location and the altitude sensors of the portable transceivers 102 to 108 can be calibrated in accordance therewith. Each portable transceiver is provided with a device-specific identifier, which is used in communication with the control transceiver.

As the operation starts, the portable transceivers 102 to 108 moving into the area 100, the control transceiver 128 controls the operation of the portable units 102 to 108. The communication takes place time-divisionally at the same frequency with all transceivers. The control transceiver 128 transmits to the portable unit a dedicated message that indicates a time window, within which the unit must perform transmission to the control unit. The transmission of the portable unit typically comprises a unit identifier, altitude sensor measurement data and possibly other measured parameters. In one embodiment alternative, the portable unit comprises one or more sensors, with which the environment of the unit can be observed, such as a temperature sensor, a movement sensor, a humidity sensor or a gas sensor.

In another embodiment alternative the portable transceivers transmit their measurement results in pre-determined time slots without control unit polling.

The control unit 128 receives from each portable transceiver 102 to 108 the measurement results of one or more sensors. First, let us assume that only an altitude sensor is used. The control unit measures the altitude with its own altitude sensor and scales the measurement result of the portable unit in accordance therewith. In this manner, for instance when an atmospheric pressure sensor is used for measuring the altitude, it is possible to compensate momentary changes in the atmospheric pressure and thus improve the accuracy of measurement. The control unit 128 transmits continuously the calibrated measurement results of each portable unit to the server 130 to be carried out.

At the same time, the direction finding stations 114, 116 determine each the direction, from which each portable transceiver transmits. The direction finding stations advantageously comprise an electronic compass, which determines a reference angle, to which the measured direction of the portable transceivers can be compared. Thus, there will be identical object coordinates in both of the direction finding stations. The direction finding stations transmit information on the angle, the reference angle and their own locations to the server 130. Alternatively, part of the processing can be transferred to the server 130.

The server 130 receives the measurement data from the direction finding stations 114, 116 and from the control unit 128. The server determines three-dimensional object coordinates, to which the direction finding stations are placed and determines the location of each portable transceiver in the coordinates by means of the measurement results of the direction finding stations and the altitude information given by the control unit. By means of the angles given by the direction finding stations it is possible to determine the location of the transceivers in the horizontal direction using simple trigonometric calculations, which need not be described here, and by means of the measurement result given by the transceiver itself it is possible to calculate the location of the device in the vertical direction. The server maintains a database on the measurement results and stores them in a memory, and thus they can be studied afterwards, if so desired.

Advantageously, the arrangement also comprises one or more workstations 132 to 134, which are connected to the server by means of a local area network, for instance. The workstations comprise software, which is arranged to retrieve from the server data on the locations of the transceivers and to display the locations graphically in an easily readable form. The workstations may read data from the server at regular intervals, whereby the location data on the display are continuously in real time. A map database can also be maintained either on the server or in the workstations. Thus, if the database includes a map on the location area of the arrangement it is possible to display the location of the transceivers over the map base, which makes the monitoring of their locations and movements even more tangible.

In some embodiments the arrangement also comprises software, by which a suitable map base can be drawn. Ready-made map bases or map bases of own making can be scaled to a suitable size.

In some embodiments the vertical location can be indicated by colour codes, for instance. In that case, it is easy to detect, which transceivers are located on the same floors in the buildings, for instance.

On the display, each transceiver can be identified by the device-specific identifier. In addition to that, it is possible to feed also other device-specific data into the database. For instance, if each device is carried by a given person, the name or any other identifier of that person can be associated with the device and shown on the display.

If the portable transceivers also comprise other sensors than the altitude sensor and the measurements carried out by these sensors are conveyed to the database on the server, these data can also be observed on the display of the workstations.

In some embodiments the transceivers can be divided into different groups, and observation can be performed groupwise. It is possible to select a given transceiver group, whose position will be monitored on the workstation display. A summary, which is shown on the side, can be formed of the data of the transceivers belonging to other groups. If the arrangement comprises a plurality of workstations, the locations of different groups can be monitored in different workstations.

The arrangement can be provided with an alarm function either on the server or in the workstation. In that case, the locations of the transceivers, or other data transmitted by them, are monitored, compared with the preset limits and an alarm is given in an audiovisual or some other manner, if the limits are exceeded. Transceiver movement monitoring can be given as an example. In the arrangement it is also possible to determine that an alarm is given if the transceiver remains stationary for a certain period of time. Then, for instance in the case of a fire, it can be suspected that everything is not in order with the fireman carrying the transceiver. Gas content monitoring can be given as another example. If the transceiver is provided with a gas sensor and the measurements show concentrations that exceed a given limit, an alarm can be given. On the basis of the alarms it will be possible to take necessary action.

For instance, by the intermediary of the control unit 128 said portable transceiver can be commanded to shift to another frequency and to transmit a continuous or a non-continuous signal. Thereafter, it is possible to start positioning said transceiver with a portable positioning unit. Transmission at another frequency can be continuous, or alternatively it can also be time-divisional or otherwise non-continuous transmission.

In one embodiment the portable transceiver is automatically transferred to another frequency. This may take place on the basis of the sensor data, for instance, or if the transceiver detects that it has not been able to establish a connection to the control unit for a certain period of time. A sensor data item can be e.g. movement sensor data indicating that the device has not moved for a certain period of time.

Figure 2:
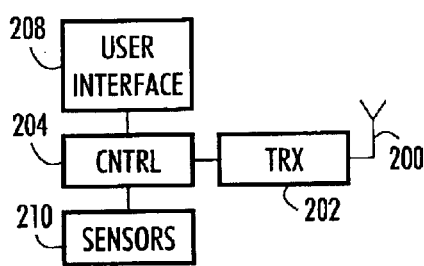
FIG. 2 is an example of a portable transceiver.

Let us study one example of a portable transceiver by means of FIG. 2. The device comprises an antenna 200 and a transceiver unit 202 connected thereto, which takes care of the actual radio frequency transmission and reception. Typically, the device operates within VHF or UHF range, because these frequencies allow high accuracy and sufficient propagation in structures inside the buildings, for instance. Optionally the device also comprises a user interface 208, by means of which the user can adjust the operation of the device. The device further comprises one or more sensors 206, and a control part 204, which controls the operation of the device. The control part 204 is typically implemented with a processor and suitable software, or with separate components. Thus, the portable transceiver comprises at least one sensor that measures a variable dependent on the altitude of the location of the device, such as atmospheric pressure. The device may also comprise other sensors measuring the ambient characteristics, as mentioned earlier. These characteristics include, for instance, temperature, various gas concentrations, etc. The device may also comprise a movement sensor, with which it is possible to detect when the device is moving and when it is stationary. When the arrangement is put into working order, the sensors of the device can be calibrated. At the same time, it is also possible to program a device-specific identifier in the device, and optionally also other parameters necessary for data transmission.

Altitude measurement can also be implemented by more than one sensor. For instance, also humidity and temperature have an effect on the atmospheric pressure. By measuring these variables as well, it may be possible to achieve a more accurate result.

In one alternative the user interface of the device comprises a microphone and an earpiece, whereby the device can be used as a telephone, if so desired. In that case, the user can communicate via the control unit.

Figure 3:
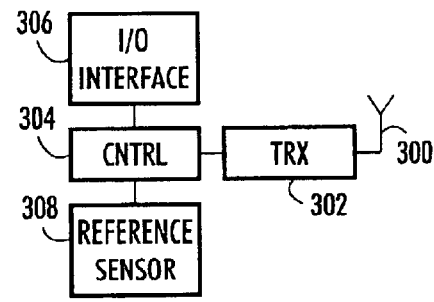
FIG. 3 is an example of a control unit.

Let us study an example of a control transceiver 128 by means of FIG. 3. The device comprises an antenna 300 and a transceiver unit 302 connected thereto, which takes care of the actual radio frequency transmission and reception. The device also comprises an I/O unit 306, which enables the device to be connected to the server via a local area network, for instance. The device further comprises one reference sensor 308 and a control part 304 that controls the operation of the device. The control part 304 is typically implemented with a processor and suitable software, or with separate components. The reference sensor 308 measures a variable dependent on the altitude of the location of the device, such as atmospheric pressure. By means of this measurement it is possible to calibrate the sensors and amend measurement results, for instance, to cancel the local changes in air pressure. The control part is arranged to control the operation of the device, as described above.

Figure 4:
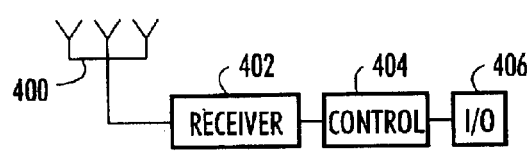
FIG. 4 is an example of a radio direction finding station.

Next, let us study the operation of a direction finding station by means of FIG. 4. In one embodiment the direction finding station is implemented by means of a wide-angle antenna structure 400, a receiver 402, an interferometer 404 and an I/O unit. The signal received by the antennas is applied via the receiver 402 to the interferometer, which processes the received signal and calculates a direction of arrival. The I/O unit enables the device to be connected through the local area network, for instance, to other parts of the system. The interferometer is typically implemented with a processor and signal processing software, or with separate components.

The interferometry is based on the use of propagation delays produced in different parts of the antenna structure 400 in determining the direction of arrival of the signal. Let us assume that the antenna structure 400 comprises two antenna elements. If the antenna elements are positioned horizontally such that they are d meters away from one another, the propagation delay between these antenna elements is proportional to the expression $d*\sin(\alpha)$, where $\alpha$ is a deviation of the direction of the arrival with respect to a perpendicular basic line. A phase difference can thus be expressed by $\phi=(2\pi d/\lambda) \sin (\alpha)$, where $\lambda$ is a signal wavelength, or $\alpha=\arcsin (\phi\lambda/2d)$.

Typically, in a simplified embodiment the antenna array may consist of two opposing antennas at a half-wave from each other. If a more accurate result is desired, more antennas, a wider angle and more sophisticated signal processing methods in the processor should be used.

Through the I/O unit 406 the measured results are conveyed to other parts of the system.

Apart from interferometry, it is also possible to implement the radio direction finding station by other means. Another known direction finding method is the so-called Adcock/Natson-Watt method. This method is based on processing an amplitude pattern. This method typically employs two antenna arrays perpendicular to one another, each antenna array consisting of two dipoles. Even though the method is very fast, it does not provide quite so high accuracy as the interferometry.

Another alternative is to use a pseudo-Doppler method for the implementation of the radio direction finding. In that case phase-sensitive technology is utilized. Antennas of a circular antenna system are alternately coupled to a direction finding receiver 402. This coupling emulates one spinning antenna, which ideally results in a real Doppler direction finding method. In order to achieve sufficient accuracy with the method, complicated antenna structures with wide-angle antennas must be used, however. The time needed for measurement is long, nevertheless.

Even though the invention is described above with reference to the example of the drawings, it is apparent that the invention is not restricted thereto, but it can be modified in a variety of ways within the scope of the inventive idea disclosed in the attached claims.

What is claimed is:

1. A method for positioning one or more mobile stations, in which the location of the mobile stations is determined in the horizontal direction using at least two direction finding stations, the method comprising:

maintaining on a server information on the location of each mobile station;

measuring in a mobile station at least one variable proportional to the location of the mobile station in the vertical direction;

signalling information from the mobile station to a control unit on the measurement results time-divisionally at the same frequency controlled by the control unit;

determining in the control unit the location of each mobile station in the vertical direction on the basis of the signalled data; and transmitting the data on the location to the server;

determining the three-dimensional location of the mobile stations in the server;

displaying the location of at least some of the mobile stations graphically.

2. The method of claim 1, wherein the direction finding stations determine their own location by means of satellite positioning.

3. The method of claim 1, wherein the direction finding stations are movable stations.

4. The method of claim 1, wherein the mobile stations measure ambient conditions and signal measurement results to the control unit.

5. The method of claim 1, wherein the mobile stations measure ambient gas concentrations and signal measurement results to the control unit.

6. The method of claim 1, wherein the mobile stations measure ambient temperature and signal measurement results to the control unit.

7. The method of claim 1, wherein the control unit measures a variable proportional to the altitude of its own location and calculates the difference in the altitude between the mobile stations and its own location.

8. The method of claim 1, wherein the locations of the mobile stations are displayed over a map base.

9. The method of claim 1, wherein each mobile station is provided with a device-specific identifier.

10. The method of claim 9, wherein the mobile stations are divided into a plurality of different groups and the locations of the mobile stations are displayed groupwise.

11. The method of claim 1, wherein the server controls the mobile station to transmit at another frequency.

12. The method of claim 1, wherein the mobile stations shifts to transmit at another frequency on the basis of sensor data.

13. The method of claim 4, comprising monitoring the measurements made by the mobile stations, comparing the measurement results with pre-set limit values, and if the limit value is exceeded, giving an alarm signal.

14. An arrangement for performing positioning, comprising a set of portable mobile stations to be positioned and at least two direction finding stations for determining the location of the mobile stations, in the arrangement the mobile stations being arranged to measure at least one variable proportional to altitude;

the arrangement comprising:

a server, which maintains information on the location of each mobile station;

a control unit, which controls the transmission of the mobile stations over a radio path such that the mobile stations signal data to the control unit on the variable proportional to the altitude time-divisionally at the same frequency, the control unit being arranged to determine at which altitude the mobile station is located on the basis of the information signalled by the mobile station and to signal the altitude data to the server, and the server being arranged to determine the three-dimensional locations of the mobile stations on the basis of the direction finding measurement and the altitude information, and the arrangement comprising workstations, which are arranged to display the location of at least some of the mobile stations graphically.

15. The arrangement of claim 14, wherein the direction finding stations are arranged to determine their own location by means of satellite positioning.

16. The arrangement of claim 14, wherein the direction finding stations are movable stations.

17. The arrangement of claim 14, wherein the mobile stations are arranged to measure ambient conditions and to signal measurement results to the control unit.

18. The arrangement of claim 14, wherein the mobile stations are arranged to measure ambient gas concentrations and to signal measurement results to the control unit.

19. The arrangement of claim 14, wherein the mobile stations are arranged to measure ambient temperature and to signal measurement results to the control unit.

20. The arrangement of claim 14, wherein the control unit is arranged to measure a variable proportional to the altitude of its own location and to calculate a difference in altitude between the mobile stations and its own location.

21. The arrangement of claim 14, wherein a workstation is arranged to display the locations of the mobile stations over a map base.

22. The arrangement of claim 14, wherein each mobile station is provided with a device-specific identifier.

23. The arrangement of claim 14, wherein the server is arranged to control the mobile station to transmit at another frequency.

24. The arrangement of claim 14, wherein the mobile station is arranged to transfer to another frequency on the basis of the sensor data.

25. The arrangement of claim 14, wherein the arrangement comprises a portable positioning unit, which is arranged to detect the direction in which the mobile station to be positioned is located.

26. The arrangement of claim 18, wherein the arrangement monitors the measurements made by the mobile stations, compares the measurement results with the preset limit values and gives an alarm signal if the limit value is exceeded.

* * * * *